US012755555B2

(12) United States Patent
Braun et al.

(10) Patent No.: US 12,755,555 B2
(45) Date of Patent: Oct. 6, 2026

(54) METHOD FOR DETERMINING SPATIAL-TEMPORAL PATTERNS RELATED TO THE ENVIRONMENT OF A VEHICLE

(71) Applicant: Aptiv Technologies AG, Schaffhausen (CH)

(72) Inventors: Marco Braun, Düsseldorf (DE); Moritz Luszek, Detmold (DE); Mirko Meuter, Erkrath (DE)

(73) Assignee: APTIV TECHNOLOGIES AG, Schaffhausen (CH)

( * ) Notice: Subject to any disclaimer, the term of this patent is extended or adjusted under 35 U.S.C. 154(b) by 68 days.

(21) Appl. No.: 18/748,781

(22) Filed: Jun. 20, 2024

(65) Prior Publication Data

US 2025/0002036 A1 Jan. 2, 2025

(30) Foreign Application Priority Data

Jun. 29, 2023 (EP) .................................... 23182494

(51) Int. Cl.
*G06V 20/58* (2022.01)

(52) U.S. Cl.
CPC .................................... *G06V 20/58* (2022.01)

(58) Field of Classification Search
CPC ............... B60W 60/001; B60W 50/00; B60W 2556/10; B60W 2050/0005; B60W 50/0098; G06N 3/049; G06V 20/58
(Continued)

(56) References Cited

U.S. PATENT DOCUMENTS 11,274,929 B1 * 3/2022 Afrouzi ..................... G06T 7/30
11,548,533 B2 * 1/2023 Liang .................... G01S 17/931
(Continued)

FOREIGN PATENT DOCUMENTS

CA 3238745 A1 * 6/2023 ............. G06N 3/045
CN 110333517 B 11/2022
CN 113056749 B * 5/2024 ............... G06N 3/09

OTHER PUBLICATIONS

S. Hoermann, M. Bach and K. Dietmayer, "Dynamic Occupancy Grid Prediction for Urban Autonomous Driving: A Deep Learning Approach with Fully Automatic Labeling," 2018 IEEE International Conference on Robotics and Automation (ICRA), Brisbane, QLD, Australia, 2018, pp. 2056-2063 (Year: 2018).*
(Continued)

*Primary Examiner* — Amelia Vorce
*Assistant Examiner* — Keith A von Volkenburg
(74) *Attorney, Agent, or Firm* — Harness, Dickey & Pierce, P.L.C.

(57) ABSTRACT

A method includes determining patterns related to an environment of a host vehicle from sequentially recorded data. Respective sets of characteristics detected by a perception system in the environment of the host vehicle are determined for a current point in time and for a predefined number of previous points in time. A set of current input data associated with the sets of characteristics is generated for the current point in time, and a set of memory data is generated by aggregating the sets of characteristics for the previous points in time. An attention algorithm is applied to the set of current input data and to the set of memory data to generate a joined spatial-temporal data set, and at least one pattern is determined for the environment of the host vehicle from the joined spatial-temporal data set.

12 Claims, 7 Drawing Sheets

(58) Field of Classification Search
USPC .......................................................... 701/23
See application file for complete search history.

(56) References Cited

U.S. PATENT DOCUMENTS

| | | | | |
|---|---|---|---|---|
| 2021/0089040 | A1* | 3/2021 | Ebrahimi Afrouzi ........................ | G05D 1/0248 |
| 2022/0066456 | A1* | 3/2022 | Ebrahimi Afrouzi ........................ | G06F 3/04883 |
| 2022/0187841 | A1* | 6/2022 | Ebrahimi Afrouzi ........................ | G05D 1/0272 |
| 2023/0166743 | A1* | 6/2023 | Heck .................... | G05B 13/027 |
| 2023/0315093 | A1* | 10/2023 | Vaughn .................... | G06N 3/04 701/27 |
| 2024/0310851 | A1* | 9/2024 | Ebrahimi Afrouzi ... | G01S 17/87 |
| 2024/0362923 | A1* | 10/2024 | Xu .......................... | G06T 7/246 |
| 2025/0264307 | A1* | 8/2025 | Ebrahimi Afrouzi .. | H04N 23/56 |

OTHER PUBLICATIONS

Nuss, Dominik, et al. "A random finite set approach for dynamic occupancy grid maps with real-time application." The International Journal of Robotics Research 37.8 (2018): 841-866. (Year: 2018).*

Long, Wangchen, et al. "Unified spatial-temporal neighbor attention network for dynamic traffic prediction." IEEE Transactions on Vehicular Technology 72.2 (2022): 1515-1529. (Year: 2022).*

H. Cao, G. Chen, J. Xia, G. Zhuang and A. Knoll, "Fusion-Based Feature Attention Gate Component for Vehicle Detection Based on Event Camera," in IEEE Sensors Journal, vol. 21, No. 21, pp. 24540-24548, 1 Nov. 1, 2021. (Year: 2021).*

Extended European Search Report regarding European Patent Application No. 23182494.7, dated Nov. 10, 2023.

"Deep Learning Method for Cell-Wise Object Tracking, Velocity Estimation and Projection of Sensor Data over Time," M. Braun, et al., 2022 IEEE 25th International Conference on Intelligent Transportation Systems (ITSC), Oct. 12, 2022.

"Context-Aware Scene Prediction Network (CASPNet)," 2022 IEEE 25th International Conference on Intelligent Transportation Systems (ITSC), Oct. 12, 2022.

"CIPF: Crossing Intention Prediction Network based on Feature Fusion Modules for Improving Pedestrian Safety," J. Ham, et al., 2023 IEEE/CVF Conference on Computer Vision and Pattern Recognition Workshops (CVPRW).

"Feature Pyramid Networks for Object Detection," T. Lin et al., 2017 IEEE Conference on Computer Vision and Pattern Recognition.

"Attention Is All You Need," A. Vaswani, et al., Aug. 2, 2023.

* cited by examiner

METHOD FOR DETERMINING SPATIAL-TEMPORAL PATTERNS RELATED TO THE ENVIRONMENT OF A VEHICLE

CROSS-REFERENCE TO RELATED APPLICATIONS

This application claims the benefit and priority of European patent application number EP23182494.7, filed on Jun. 29, 2023. The entire disclosure of the above application is incorporated herein by reference.

FIELD

This section provides background information related to the present disclosure which is not necessarily prior art.

The present disclosure relates to a method for determining spatial-temporal patterns related to an environment of a host vehicle from sequentially recorded data.

BACKGROUND

For autonomous driving and various advanced driver-assistance systems (ADAS), it is an important and challenging task to understand the traffic scene in the external environment surrounding a host vehicle. For example, based on sensor data acquired at the host vehicle, spatial and temporal correlations may be exploited for understanding the traffic scene, e.g. for tracking and/or anticipating the dynamics of any items present in the external environment.

For providing information regarding the environment of the host vehicle, machine learning algorithms including recurrent units may be applied to data provided by sequential sensor scans performed by sensors of a perception system of the host vehicle. Such machine learning algorithms may be able to derive spatial and temporal patterns which are related, for example, to moving objects in the environment of the host vehicle, via the data provided by the sequential sensor scans.

In detail, such sensor scans are performed for a predefined number of points in time, and sensor data may be aggregated over the previous points in time, i.e. before a current point in time, in order to generate a so-called memory state. The memory state is combined with data from a current sensor scan, i.e. for the current point in time, in order to derive the spatial and temporal pattern, i.e. based on correlations within the sequential sensor scans.

Machine learning algorithms including recurrent units, however, may only be able to implicitly derive dynamical properties of objects, e.g. from displacements of respective patterns. For example, a recurrent unit may correlate a first cluster of features in the memory state which indicates that an object is present at a previous point in time, with a second cluster of features in the novel or current data which indicate that an object is present at the current point in time.

Therefore, a model on which the machine learning algorithm relies may not be able to differentiate between distinct objects within a receptive field associated with the environment of the host vehicle. Moreover, the model may also not be able to incorporate legacy information regarding the dynamics of objects at a previous point in time in order to improve the estimation of dynamic properties, e.g. a velocity of a certain object, for the current point in time. Hence, such a model may also not be able to use the legacy information for an improved matching of objects by utilizing the dynamic properties for an improved identification of the respective position of objects for the next point in time or frame.

Accordingly, there is a need to have a method which is able to explicitly correlate sequentially recorded data detected in an external environment of a vehicle in order to provide reliable patterns for the environment.

SUMMARY

This section provides a general summary of the disclosure, and is not a comprehensive disclosure of its full scope or all of its features.

The present disclosure provides a computer implemented method, a computer system and a non-transitory computer readable medium according to the independent claims. Embodiments are given in the subclaims, the description and the drawings.

In one aspect, the present disclosure is directed at a computer implemented method for determining patterns related to an environment of a host vehicle from sequentially recorded data. According to the method, respective sets of characteristics detected by a perception system of the host vehicle in the environment of the host vehicle are determined for a current point in time and for a predefined number of previous points in time. Via a processing unit of the host vehicle, a set of current input data associated with the sets of characteristics is generated for the current point in time, and a set of memory data is generated by aggregating the sets of characteristics for the previous points in time. An attention algorithm is applied to the set of current input data and to the set of memory data in order to generate a joined spatial-temporal data set, and at least one pattern is determined for the environment of the host vehicle from the joined spatial-temporal data set.

The perception system may include, for example, a radar system, a Lidar system and/or one or more cameras being installed at the host vehicle in order to monitor its external environment. Hence, the perception system may be able to monitor a dynamic context of the host vehicle including a plurality of objects which are able to move in the external environment of the host vehicle. The objects may include other vehicles and/or pedestrians, for example. The perception system may also be configured to monitor static objects, i.e. a static context of the host vehicle. Such static objects may include traffic signs or lane markings, for example.

The respective set of characteristics detected by the perception system may be acquired from the sequentially recorded data by using a constant sampling rate, for example. Therefore, the current and previous points in time may be defined in such a manner that there is a constant time interval therebetween. Accordingly, the predefined number of previous points in time may include an earliest point in time and a latest point in time which may immediately precede the current point in time.

The output of the method, i.e. the at least one pattern related to the environment of the host vehicle, may be provided as an abstract feature map which may be stored in a grid map. The grid map may be represented by a two-dimensional grid in bird's eye view with respect to the vehicle. However, other representations of the grid map may be realized alternatively. The grid map may include a predefined number of cells. With each cell, a predefined number of features may be associated in order to generate the feature map.

Further tasks being implemented e.g. as further respective machine learning algorithms may be applied, e.g. comprising a decoding procedure, to the feature map including the at least one pattern related to the environment of the host vehicle. These tasks may include different kinds of information regarding the dynamics of a respective object, e.g. regarding its position, its velocity and/or regarding a bounding box surrounding the respective object. That is, the objects themselves, i.e. their positions, and their dynamic properties may be detected and/or tracked by applying a respective task to the feature map including the pattern. Moreover, a grid segmentation may be performed as a task being applied to the feature map, e.g. in order to detect a free space in the environment of the host vehicle.

The method may be implemented as one or more machine learning algorithms, e.g. as neural networks for which suitable training procedures are defined. When training the machine learning algorithms or neural networks, the output of the method and a ground truth may be provided to a loss function for optimizing the respective machine learning algorithm or neural network. The ground truth may be generated for a known environment of the host vehicle for which sensor data provided by the perception system may be preprocessed in order to generate data e.g. associated with a grid map in bird's eye view.

This data may be processed by the method, and the respective result of the further tasks, e.g. regarding object detection and/or segmentation for determining a free space, may be related to the known environment of the host vehicle. The loss function may acquire an error of a model with respect to the ground truth, i.e. the model on which the machine learning algorithm or neural network relies on. Weights of the machine learning algorithms or neural networks may be updated accordingly for minimizing the loss function, i.e. the error of the model.

The method according to the disclosure differs from previous approaches which apply e.g. recurrent units in that the attention algorithm is applied in order to explicitly exploit correlations between the set of memory data being aggregated up to the latest previous point in time and the set of current input data. These correlations are represented by the joint spatial-temporal data set. By using the attention algorithm, the method is able to explicitly correlate patterns, e.g. for the dynamics of objects, for consecutive frames or consecutive points in time.

Due to this, the method is able to differentiate between distinct objects within the external environment of the host vehicle, i.e. within a receptive field of the method, and to provide or track their dynamic properties uniquely for the points in time under consideration. Moreover, legacy information from the memory data, e.g. regarding the dynamics of the different objects, is considered via the attention algorithm within the joint spatial-temporal data set in order to derive the respective pattern therefrom. For example, an explicit spatial displacement may be derived from the feature map, and the spatial displacement may be converted into an improved estimation of the respective velocity of the objects and an improved estimation of the object's position in the next frame or for the next point in time in order to improve the matching of objects between frames or time steps.

According to an embodiment, the set of current input data and the set of memory data may be associated with respective grid maps defined for the environment of the host vehicle. The association with the grid maps may facilitate the representation of the respective patterns related to the plurality of objects. For example, the grid maps may include a plurality of grid cells, each comprising different channels for each of the respective characteristics of the environment of the host vehicle.

When applying the attention algorithm, a matching may be determined between a cell of the grid map associated with the set of current input data and a plurality of cells of the grid map associated with the set of memory data. Alternatively, the matching may be determined between one of the cells of the grid map associated with the set of current input data and a plurality of cells of the grid map associated with the set of memory data and, in addition, with the set of current input data. In other words, the current input data may also be considered for the plurality of cells of the grid map which is matched with one of the cells of the grid map associated with the set of current input data. The attention algorithm may therefore provide a relationship between a cell of the grid map under consideration at the current point in time and a "dynamic history" leading to the status of the current input data, i.e. for the current point in time.

According to a further embodiment, the attention algorithm may include weights which are defined by relating elements of the set of current input data and assigned elements of the set of memory data. The weights of the attention algorithm may be applied to values generated by employing a union of the elements of the set of current input data and the assigned elements of the set of memory data in order to provide the joint spatial-temporal data set as an output of the attention algorithm.

For example, the elements of the set of current input data may refer to one or more grid cells related to a certain object under consideration, and the assigned elements of the set of memory data which are to be related to the elements of the set of current input data may be associated with the previous dynamics of this object which is represented by more than one of the grid cells. By defining or generating the weights of the attention algorithm by the relationship of the current input data and the memory data, and by applying these weights to values generated based on a portion of the current input data and the memory data, legacy information regarding the dynamics is transferred from the memory data when generating the joint spatial-temporal data set. Therefore, the reliability of the determined patterns is improved via the attention algorithm.

Relating the elements of the set of current input data and the assigned elements of the set of memory data may include: generating a query vector by employing the elements of the set of current input data, generating a key vector by employing the assigned elements of the set of memory data and the elements of the set of current input data, and estimating a dot product of the query vector and the key vector from which the weights of the attention algorithm are estimated. That is, via the dot product a matching for agreement between the query vector and the key vector is estimated which represents the correlation therebetween and defines the weights for the attention algorithm.

The key vector may be generated based on a concatenation of the assigned elements of the set of memory data and the elements of the set of current input data.

For generating the joint spatial-temporal data set, the output of the attention algorithm may further be combined with the set of memory data. A gating procedure may be configured to define weights for combining respective channels within the set of memory data with the output of the attention algorithm. The gating procedures may therefore adjust for each channel within the set of memory data how the memory state and the output of the attention algorithm are to be combined.

According to a further embodiment, information regarding respective distances with respect to a spatial reference point may be associated with the set of current input data and with the set of memory data in order to track movements of objects between one of the previous points in time and the current point in time. The spatial reference point may be defined at the host vehicle. The information regarding respective distances may be defined on a mesh grid of distances, and/or existing grid maps may be enriched by the information regarding the respective distances. By tracking the movements of the objects, a velocity estimation may be performed.

The information regarding the respective distances associated with the set of memory data may be determined via a motion model which includes a velocity estimation for the objects. For example, a velocity estimation may be performed for the objects for one of the previous points in time and transferred to the current point in time via the motion model.

Moreover, positional information may be associated with elements of the set of current input data and assigned elements of the set of memory data in order to estimate a velocity of an object in the environment of the host vehicle. The velocity estimation may be performed via an estimation of displacement between the current point in time and one of the previous points in time. The positional information may be provided as positional encodings which may be concatenated to the input data which may be used thereafter to calculate the query, the key and the value as described above The at least one pattern may be provided to an algorithm for object detection which may determine at least one of a position, a velocity and coordinates of the bounding box associated with at least one of a plurality of objects located in the environment of the host vehicle, and/or to an algorithm for segmenting the environment of the host vehicle. The segmenting of the environment may include determining a free space e.g. based on a grid segmentation. Based on this information regarding the respective object, a tracking of the object may be performed, for example.

In another aspect, the present disclosure is directed at a computer system, said computer system being configured to carry out several or all steps of the computer implemented method described herein. The computer system may be further configured to receive respective sets of characteristics detected by a perception system of a host vehicle in an environment of the host vehicle for a current point in time and for a predefined number of points in time before the current point in time.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

As used herein, terms like processing unit and module may refer to, be part of, or include an Application Specific Integrated Circuit (ASIC), an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The processing unit may include memory (shared, dedicated, or group) that stores code executed by the processor.

In another aspect, the present disclosure is directed at a vehicle including a perception system and the computer system as described herein. The vehicle may be an automotive vehicle, for example.

According to an embodiment, the vehicle may further include a control system being configured to receive information derived from the at least one pattern provided by the computer system and to apply the information for controlling the vehicle. The information derived from the at least one pattern may include properties of objects detected in the environment of the host vehicle and/or a segmentation of the environment including a free space.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM); a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Exemplary embodiments and functions of the present disclosure are described herein in conjunction with the following drawings, showing schematically:

Corresponding reference numerals indicate corresponding parts throughout the several views of the drawings.

DETAILED DESCRIPTION

Example embodiments will now be described more fully with reference to the accompanying drawings.

Figure 1:
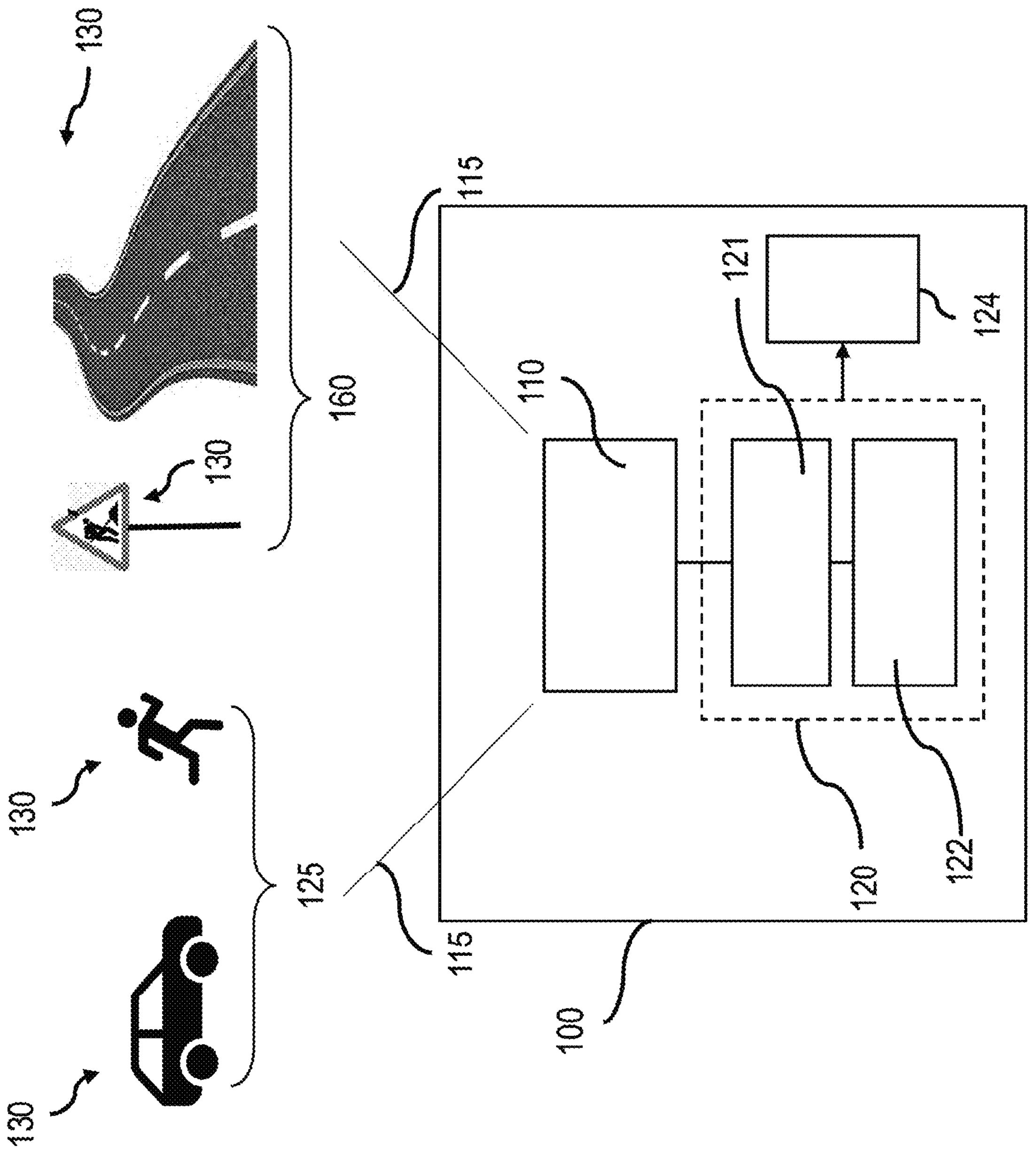
FIG. 1 is an illustration of a vehicle including a computer system according to the disclosure and of the vehicle's surroundings.

FIG. 1 depicts a schematic illustration of a vehicle 100 and of objects 130 possibly surrounding the vehicle 100 in a traffic scene. The vehicle 100 includes a perception system 110 having an instrumental field of view which is indicated by lines 115. The vehicle 100 further includes a computer system 120 including a processing unit 121 and a data storage system 122 which includes a memory and a database, for example. The processing unit 121 is configured to receive data from the perception system 110 and to store data in the data storage system 122. The vehicle 100 further includes a control system 124 which is configured to control the vehicle 100.

The perception system 110 may include a radar system, a LiDAR system and/or one or more cameras in order to monitor the external environment or surroundings of the vehicle 100. Therefore, the perception system 110 is configured to monitor a dynamic context 125 of the vehicle 100 which includes a plurality of objects 130 which are able to move in the external environment of the vehicle 100. The objects 130 may include other vehicles and/or pedestrians, for example.

The perception system 110 is also configured to monitor a static context 160 of the vehicle 100. The static context 160 may include static objects 130 like traffic signs and lane markings, for example.

The perception system 110 is configured to determine characteristics of the objects 130. The characteristics include a current position, a current velocity and an object class of each road user 130 for a plurality of points in time. The current position and the current velocity are determined by the perception system 110 with respect to the vehicle 100, i.e. with respect to a coordinate system having its origin e.g. at the center of mass of the vehicle 100, its x-axis along a longitudinal direction of the vehicle 100 and its y-axis along a lateral direction of the vehicle 100. Moreover, the perception system 100 determines the characteristics of the road users 130 for a predetermined number of previous points in time and for a current point in time, e.g. for each 0.5 s.

The computer system 120 transfers information derived from the result or output 260 (see FIG. 2) of the method according to the disclosure, i.e. from at least one pattern related to the environment of the host vehicle 100, to the control system 124 in order to enable the control system 124 to use the information derived from the at least one pattern for controlling the vehicle 100.

Figure 2:
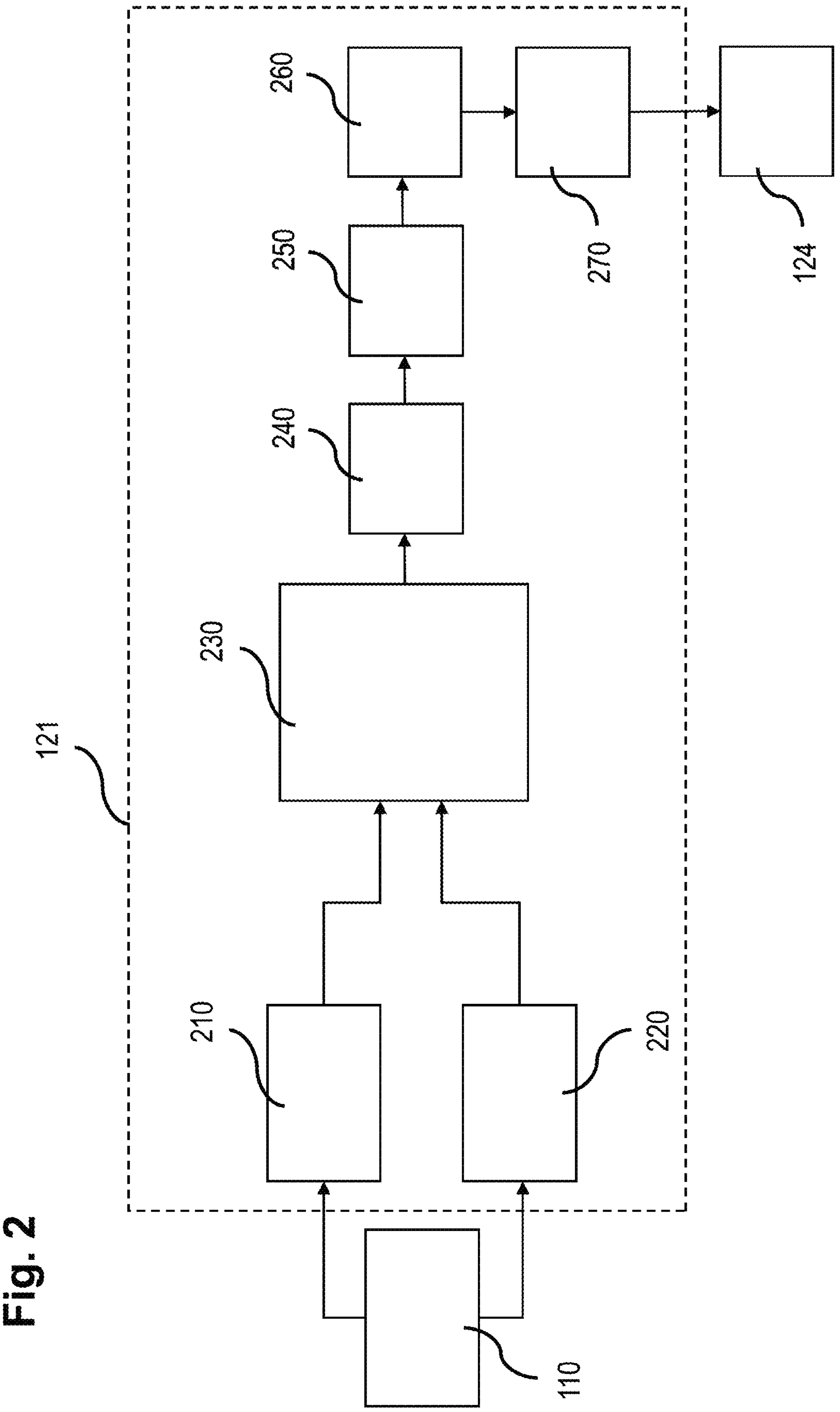
FIG. 2 is an illustration of an overview of the method according to the disclosure.

FIG. 2 depicts an overview of a method according to the disclosure for determining patterns related to an environment of the host vehicle 100 (see e.g. FIG. 1) from sequentially recorded data. First, for a plurality of objects 130 (see FIG. 1) in the environment of the host vehicle 100, a respective set of characteristics is detected by the perception system 110 of the host vehicle 100 for a current point in time and for a predefined number of previous points in time.

The characteristics for the current and the previous points in time are transferred to the processing unit 121 which generates a set of current input data 210 associated with the sets of characteristics for the current point in time, and a set of memory data 220 by aggregating the sets of characteristics over the predefined number of previous points in time. To the set of current input data 210 and to the set of memory data 220, an attention algorithm 230 is applied via the processing unit 121 in order to generate a joint spatial-temporal data set.

An output 360 of the attention algorithm 230 is subjected to a first residual block 240 and to a second residual block 250 in order to determine an output 260 which includes at least one pattern from the joint spatial-temporal data set. Details for the different blocks 210 to 250 as shown in FIG. 2 will be described below in context of FIGS. 3 and 4.

The output 260, i.e. the at least one pattern related to the environment of the host vehicle 100, is provided as an abstract feature map which is stored in a grid map. This grid map is generated in a similar manner as described below for respective grid maps generated for associating the set of current input data 210 and the set of memory data 220 therewith (see also FIG. 3).

The respective grid maps for the output 260, for the set of current input data 210 and for the set of memory data 220 are represented by a two-dimensional grid in bird's eye view with respect to the host vehicle 100. However, other representations of the grid maps may be realized alternatively. The grid maps include a predefined number of cells. For the output 260, a predefined number of features is assigned to each cell in order to generate the feature map.

The output 260, i.e. the feature map described above, is transferred to a task module 270 which applies further tasks to the feature map including the at least one pattern related to the environment of the host vehicle 100. These tasks include tasks related to an object detection and/or to a segmentation of the environment of the host vehicle 100, i.e. to a segmentation of the grid map associated with the output 260.

The object detection provides different kinds of information regarding the dynamics of a respective object 130, e.g. regarding its position, its velocity and/or regarding a bounding box surrounding the respective object 130. That is, the objects 130 themselves, i.e. their positions, and their dynamic properties are detected and/or tracked by applying a respective task of the task module 270 to the feature map including the pattern. Moreover, the grid segmentation is applied e.g. in order to detect a free space in the environment of the host vehicle 100.

The results of the task module 270 as described above are provided to the control system 124 in order to use these results, e.g. the properties of the objects 130 and/or the free space, as information for controlling the host vehicle 100.

The attention algorithm 230, the first residual block 240 and the second residual block 250 are implemented as respective machine learning algorithms, e.g. as a respective neural network for which suitable training procedures are defined. The task module 270 including the further tasks is also implemented as one or more machine learning algorithms, e.g. comprising a respective decoding procedure, being associated with the respective task. The task module 270 includes a respective head for each required task.

When training the machine learning algorithms or neural networks, the output 260 and a ground truth are provided to a loss function for optimizing the neural network. The ground truth is generated for a known environment of the host vehicle 100 for which sensor data provided by the perception system is preprocessed in order to generate data associated with a grid map e.g. in bird's eye view. This data is processed by the method, and the respective result of the different heads of the task module 270, i.e. regarding object detection and/or segmentation for e.g. determining a free space, is related to the known environment of the host vehicle 100. The loss function acquires the error of a model, i.e. the model on which the machine learning algorithm or neural network relies, with respect to the ground truth. Weights of the machine learning algorithms or neural networks are updated accordingly for minimizing the loss function, i.e. the error of the model.

Figure 3:
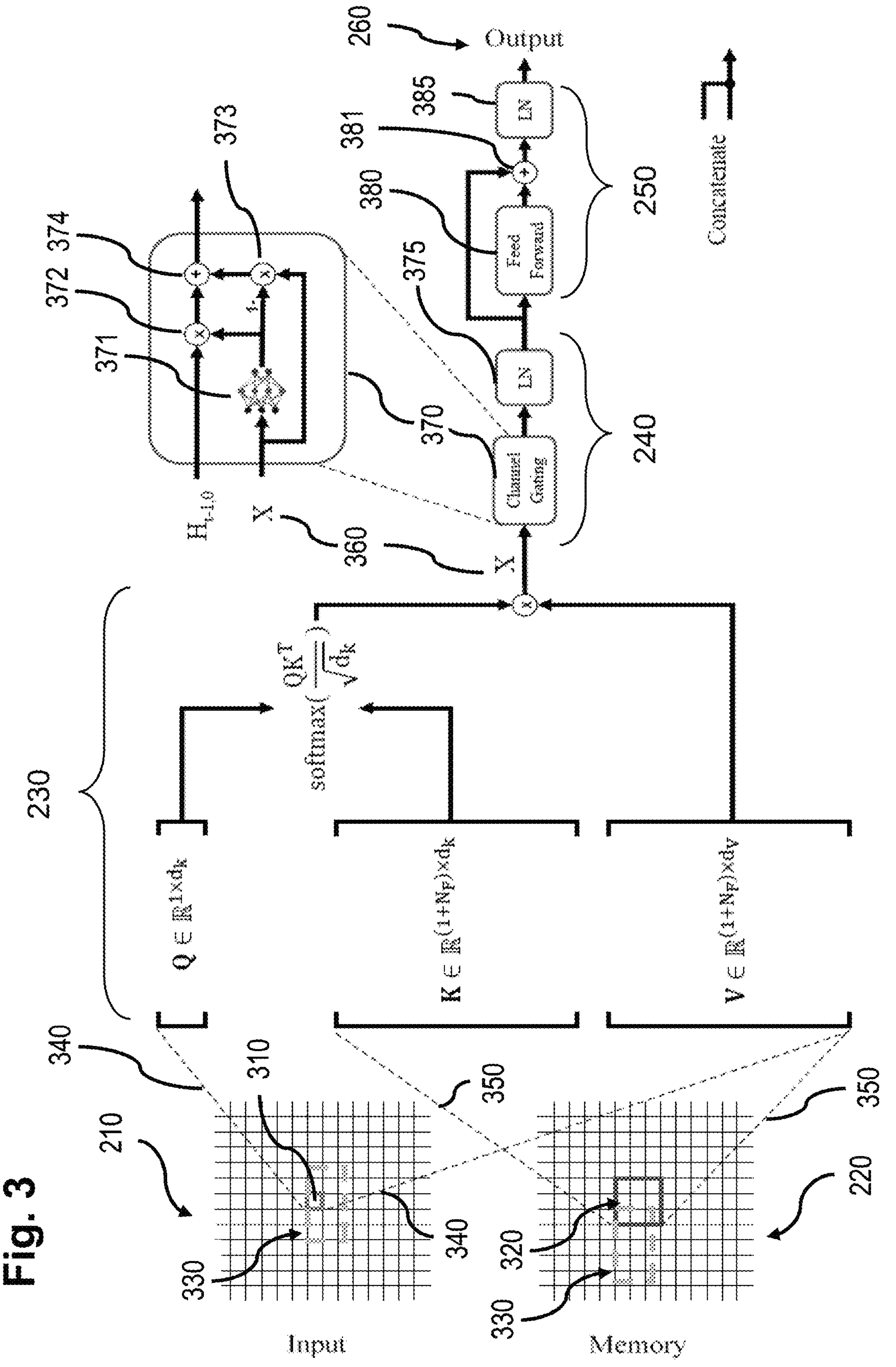
FIG. 3 is an illustration of details regarding the steps of the method as shown in FIG. 2.

With respect to FIG. 3, the set of current input data 210 and the set of memory data 220 are associated with respective grid maps which have the same size and which are defined as a receptive field for the method within the environment of the host vehicle 100. That is, the respective dynamic and static contexts 125, 160 (see FIG. 1) are provided in form of images for the current point in time and as an aggregation for the previous points in time. In other words, the characteristics of the objects 130 are rasterized or associated with respective elements of the grid maps within a predefined region of interest around the vehicle 100. The predefined region of interest of the vehicle 100 is first rasterized as an empty multi-channel image in which each pixel covers the fixed area. For example, the region of interest may cover an area of 80 m×80 m in front of the vehicle 100 and may be rasterized into an 80×80 pixel image, wherein each pixel represents a square area of 1 m×1 m.

For each pixel or cell of the respective grid map or image, a respective channel is associated with one of the characteristics or features of the object 130. Hence, the empty multi-channel image mentioned above and representing the rasterized region of interest close to the vehicle 100 is filled by the characteristics of the objects 130 which are associated with the respective channel of the pixel or grid cell.

The information provided by the characteristics of the object 130 for the different points in time is aggregated e.g. at a cell 310 under consideration due to spatial-temporal correlations. The cell 310 is located at an imaginary vehicle 330 for the current point in time. In order to derive patterns regarding objects 130, e.g. for the imaginary vehicle 330, a matching is calculated between the information provided at the cell 310 and information provided by a plurality of cells 320 to which the memory data 220 is associated and which are relevant for the aggregation of information provided at the cell 310 under consideration within the set of current input data 210.

Generally speaking, a subset $X^I$ of the set of current input data 210 represented by $I_t$ is considered:

$$X^I \subset I_t \tag{1}$$

which comprises the cell 310, for the example, as shown in FIG. 3. The matching is to be calculated between the subset $X^I$ and a subset $X^H$ of the set of memory data 220 represented by $H_{t-1}$, i.e. the memory data aggregated over the previous points in time up to the time step t−1 which is the latest time step before the current point in time:

$$X^H \subset H_{t-1} \tag{2}$$

In the example as shown in FIG. 3, the subset $X^H$ includes the cells 320 which are relevant for aggregating information for the cell 310 in the current input data. The cells 320 include, for example, the cells closest to the cell 310 in terms of an Euclidean distance.

Within the attention algorithm 230, the matching of information is calculated between the respective cells of the set of current input data 210, e.g. for the cell 310, and a union $X^I \cup X^H$ of the subset of the current input data 210 and the subset of the memory data 220. In detail, the respective cells, like the cell 310 under consideration, within the set of current input data 210 are considered for determining a query Q within the attention algorithm 230, and for determining keys K as well as values V of the attention algorithm 230 as indicated by the dashed lines 340 in FIG. 3.

In contrast, respective subsets of the set of memory data 220, e.g. as provided by the cells 320 shown in FIG. 3, are considered for determining the keys K and the values V of the attention algorithm 230 only, as indicated by the dashed lines 350 shown in FIG. 3. Since the set of current input data 210 associated with the subset of grid cells, e.g. the cell 310 under consideration, is taken into account when calculating the keys K and the values V of the attention algorithm 230 in addition to the set of memory data 220 associated with a subset of grid cells, e.g. the cells 320 as shown in FIG. 3, the keys and the values of the attention algorithm 230 are based on the union $X^I \cup X^H$, i.e. of the union of the information provided by the cells 310 and the cells 320 as shown in FIG. 3.

In detail, the query Q is calculated by linearly projecting $X^I$ as $$Q = f_{\theta_Q}(X^I) \tag{3}$$

wherein $\theta_Q$ denotes trainable parameters of matrices utilized for the linear projections.

Figure 4:
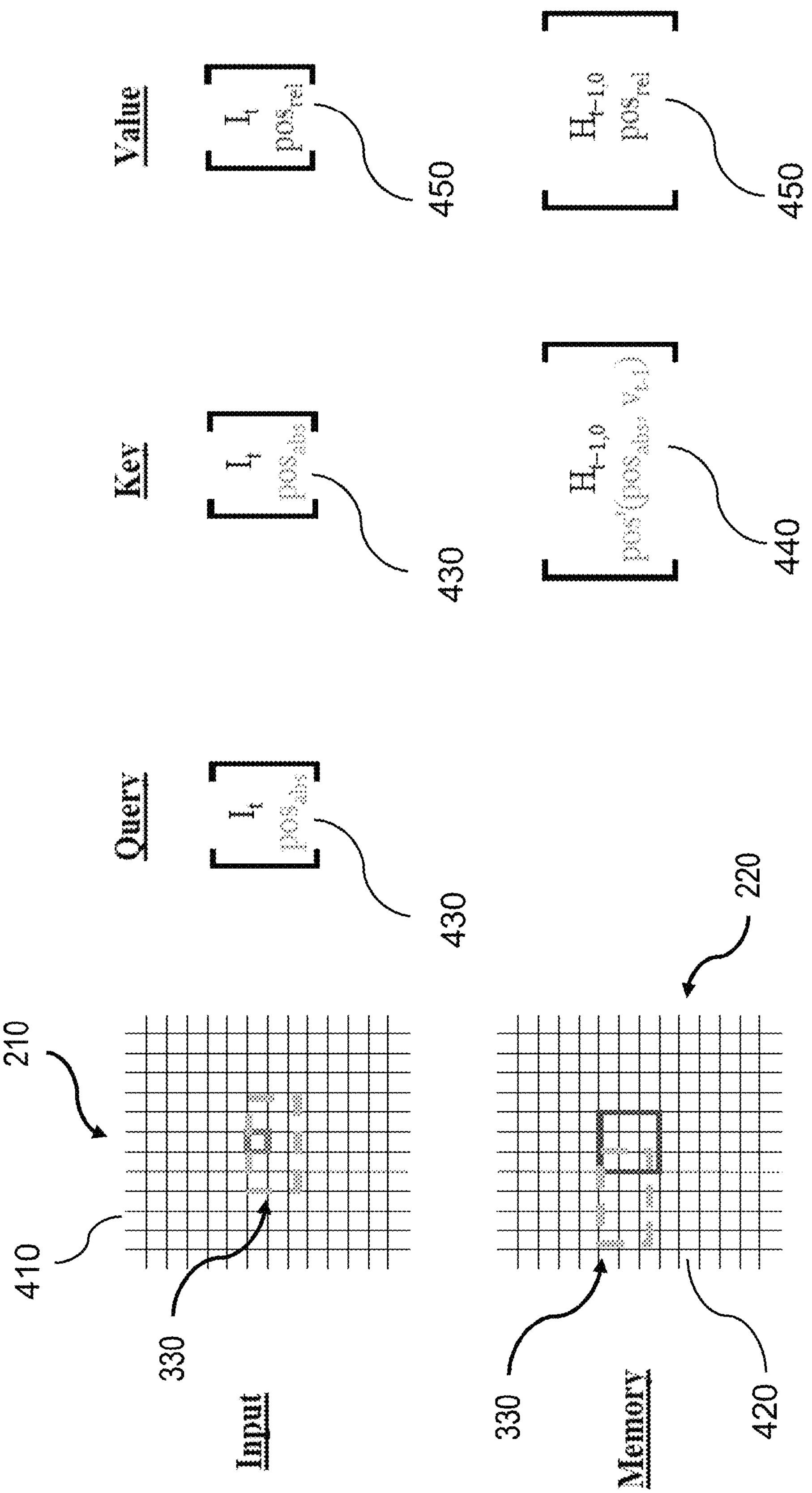
FIG. 4 is an illustration of further details regarding the steps of the method as shown in FIGS. 2 and 3.

Similarly, the keys K are provided by a second linear projection:

$$K = f_{\theta_K}([X^I, X^H]) \tag{4}$$

wherein $\theta_K$ denotes trainable parameters of matrices used for the linear projections, and $[X^I, X^H]$ defines a concatenation of the two subsets or feature maps $X^I$, $X^H$ along a so-called token dimension, i.e. along the columns and rows of the grid maps as shown in FIGS. 3 and 4.

In order to calculate the matching between $X^I$ and the union $X^I \cup X^H$, a dot product of the query Q and the keys K is used which is subjected to a softmax function as follows:

$$W^{Att} = softmax\left(\frac{QK^T}{\sqrt{d_k}}\right) \tag{5}$$

wherein the term $d_k$ denotes the length of the key and query vectors Q, K per token, and $W^{Att}$ denotes so-called attention weights which have the following properties:

$$W^{Att} \in [0, 1]^{1\times(1+N_F)} \tag{6}$$

$$\sum W^{Att} = 1 \tag{7}$$

It is noted that $N_F$ denotes the number of cells or tokens comprised by the subset $X^H$ obtained from the receptive field within $H_{T-1}$, e.g. the information provided by the cells 320 as shown in FIG. 3. Hence, the union or feature map $X^I \cup X^H$ includes $1+N_F$ feature vectors, and therefore, the attention weights $W^{Att}$ define the individual matching between $X^I$ and the $1+N_F$ entries within the union $X^I \cup X^H$.

Moreover, the values are also defined by a linear projection as follows:

$$V = f_{\theta_V}([X^I, X^H]) \tag{8}$$

wherein $\theta_V$ denotes trainable parameters of the respective matrices used for the linear projection, and $[X^I, X^H]$ again denotes the concatenation of the two subsets or feature maps $X^I$ and $X^H$ along the token dimension.

Finally, the output 360 of the attention algorithm 230 is provided as a weighted sum of the attention weights and the values as follows:

$$Out^{Att} = \sum_{i=1}^{1+N_F} W_i^{Att} V_i \quad (9)$$

In summary, the attention algorithm 230 aggregates information from the union provided by the set of current input data 210 and the set of memory data 220 to a target location, e.g. the cells 310 under consideration as shown in FIG. 3, for the current point in time t. Due to the application of the dot product for estimating the attention weights, the algorithm is able to explicitly control the aggregation of information from the union of the set of current input data 210 and the set of memory data 220 at the target location of the cell 310 for the current point in time t.

The first residual block 240 combines the output 360 of the attention algorithm 230 again with the memory state $H_{t-1}$ which is represented by the set of memory data 220. Hence, when regarded on a larger scale, the first and second residual blocks 240, 250 provide a recurrent functionality similar to known recurrent units.

In detail, the first residual block 240 includes a channel gating module 370 which defines a weighted sum for the combination of the output 360 of the attention algorithm 230 and the memory state $H_{t-1}$ 220. The weights defined by the channel gating module 370 are given as follows:

$$W^{Gate} = \sigma\left(f_{\theta_{W\_Gate}}\left(Out^{Att}\right)\right) \quad (10)$$

wherein $\sigma$ denotes sigmoid activation function and $\theta_{W\_Gate}$ represents trainable parameters of the channel gating module 370. $Out^{Att}$ is the output 360 of the attention algorithm 230.

Without the channel gating module 370, the method would merely perform a weighting across the value vector V as a whole. Known recurrent units, however, allow gating channels of a memory state like $H_{t-1}$ individually.

In order to achieve a similar degree of freedom regarding feature propagation, the channel gating module 370 uses the weighted sum as mentioned above and depicted in detail in the enlarged subdiagram of the channel gating module 370 in FIG. 3. The calculation of the weights as defined in formula (10) above is depicted schematically at 371. The weights are applied at 372 and 373 to the memory state $H_{t-1}$ and to the output 360 of the attention algorithm 230, respectively. The weighted channels are combined at 374 in order to generate a weighted sum as an output of the channel gating module 370. Due to the channel gating module 370 within the first residual block 240, the method is able to control on a channel-wise basis how the memory state $H_{t-1}$ and the output 360 of the attention algorithm 230 are combined.

The output of the channel gating module 370 is subjected to a layer norm 375. By the layer norm 375, the gated features provided as an output of the channel gating module 370 are given within a uniform value range for the feature maps which reduces a covariant shift.

The second residual block 250 includes a feedforward block 380 and a further layer norm 385. The feedforward block 380 includes two-dimensional convolutional network with kernel sizes of 1×1 such that:

$$Out^{Res_2} = f_{\theta_{FF_2}}\left(ReLU\left(f_{\theta_{FF_1}}\left(Out^{Res_1}\right)\right)\right) \quad (11)$$

$Out^{Res1}$ represents the output of the first residual block 240, while $\theta_{FF1}$ and $\theta_{FF2}$ denote trainable parameters for the first and second convolutional network within the feedforward module 380, respectively. ReLU denotes a rectified linear unit activation function. $Out^{Res2}$ denotes the output of the feedforward module 380 which is combined with the output of the first residual module 240 at 381. The combination of the output of the first residual module 240 and the feedforward module 380 generated at 381 is subjected to the further layer norm 385 in order to provide the output 260 of the entire method according to the disclosure.

The method as described above generates a joint spatial-temporal data set including spatial-temporal correlations between the set of current input data 210 and the set of memory data 220 which are exploited to determine at least one pattern related to the plurality of objects 130 detected in the environment of the host vehicle 100. In order to achieve an "increased expressiveness" regarding the dynamics of the traffic scene surrounding the host vehicle 100, i.e. to enhance object tracking, for example, additional information may be incorporated into the method as is depicted in FIG. 4.

For this purpose, respective grids 410, 420 associated with the set of current input data 210 and the set of memory data 220, respectively, further contain distances of each grid cell with respect to a spatial reference position located at a rear bumper of the host vehicle 100 (see FIG. 1). In detail, each of the queries Q as defined above is extended or enriched by metric coordinates $pos_{abs}$ of each grid cell with respect to the spatial reference position. The same holds true for the keys K regarding the set of current input data 210 represented by $I_t$. The enrichment of the query Q and the keys K for the set of current input data 210 by these metric coordinates $pos_{abs}$ is denoted by 430 in FIG. 4.

Simultaneously, velocities $v_{t-1}$ in longitudinal and lateral directions with respect to the grid and for the preceding point in time t−1 are predicted for the detected objects 130 (see FIG. 1) for each grid cell. The velocities $v_{t-1}$ may be estimated by an arbitrary velocity estimation head for the previous point in time t−1 and provided to the method for a velocity estimation at the current point in time t. Based on the velocity $v_{t-1}$, the metric coordinates $pos_{abs}$ for the previous point in time t−1 are projected via a motion model as follows:

$$pos'(pos_{abs}, v_{t-1}) = pos_{abs} + \frac{v_{t-1}}{f_R} \quad (12)$$

wherein $f_R$ is a constant frequency, e.g. 20 Hz, indicating a frame rate under which sensor scans are performed by the perception system 110 (see FIG. 1).

By the projected target location or coordinates pos', the keys K of the union $X^I \cup X^H$ as described above are extended or enriched in a similar manner as the query Q and the key K for the set of current input data 210. The enrichment of the keys K regarding the set of memory data represented by $H_{t-1}$ is indicated by 440 in FIG. 4.

By this means, the model underlying a method according to the disclosure is able to incorporate prior assumptions on the location in which an object 130 moving for the current point in time t−1 is contained by a specific grid cell at the current point in time t. Before concatenating the respective tokens for calculating the query Q and the key vectors K, $pos_{abs}$ and pos' are scaled by a constant factor such that they include values in the range of [−1, 1] in order to maintain stable gradient during training.

In order to provide predictions regarding velocities of objects 130, a "positional awareness" is introduced for the values V as indicated by 450 in FIG. 4. In detail, the values V are also extended or enriched by positional encodings, i.e. relative distances $pos_{rel}$ defined for each grid cell with respect to a center location of the moving imaginary vehicle 330. $pos_{rel}$ also includes longitudinal and lateral coordinates defined with respect to the grids 410, 420.

By concatenating the input tokens to the value calculation and poSrel, the above-mentioned awareness of direction and distances is achieved. As a result, the displacement of an object 130 moving e.g. from an arbitrary position to the central position of the "sliding window" as shown in FIG. 4 by the dashed lines indicating the imaginary vehicle 330 can be measured. That is, the corresponding velocity can be predicted after determining the displacement of the object 130 for the time interval between the previous point in time t−1 and the current point in time t.

Figure 5:
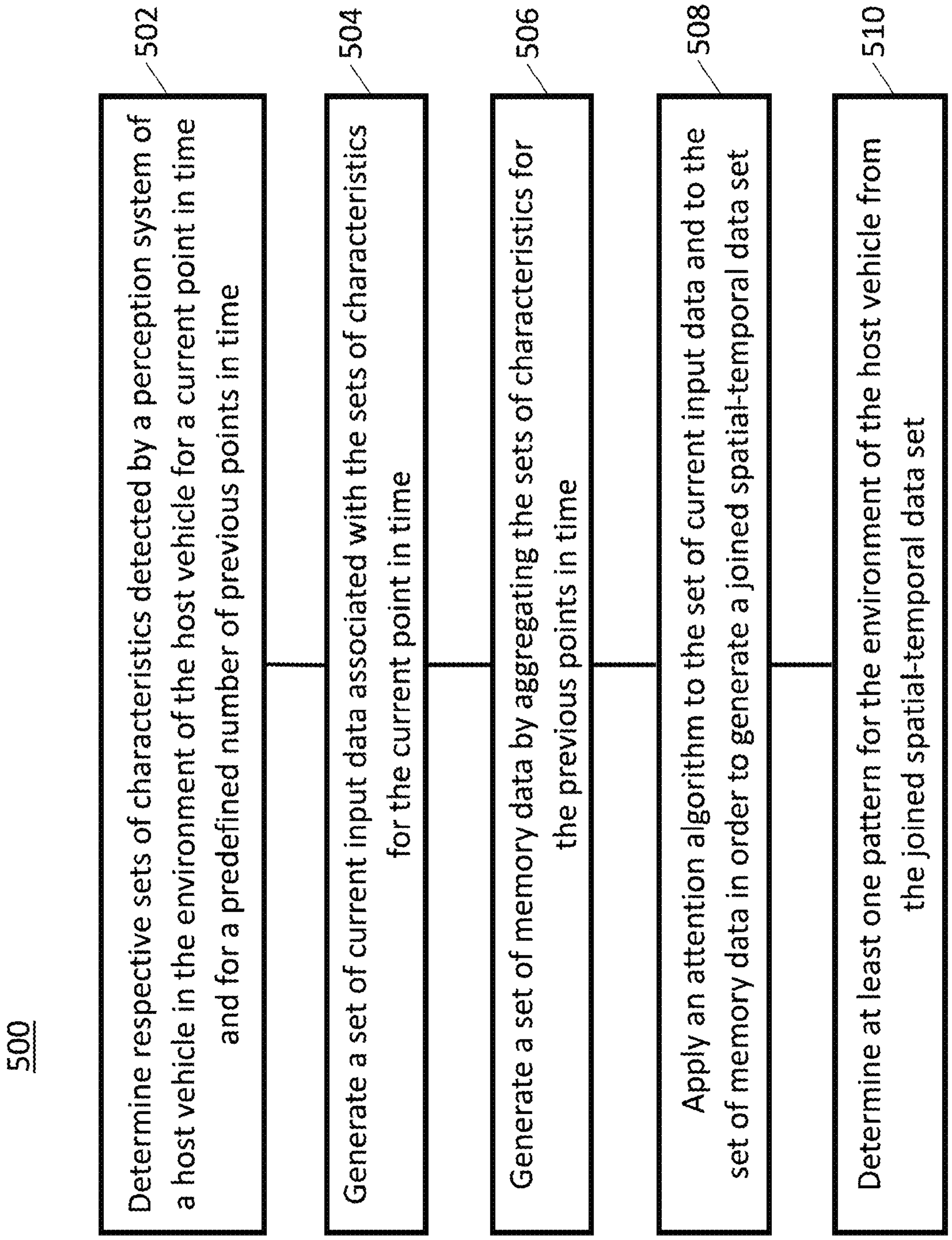
FIG. 5 is an illustration of a flow diagram illustrating a method for determining patterns related to an environment of a host vehicle from sequentially recorded data according to various embodiments.

FIG. 5 shows a flow diagram 500 illustrating a method for determining patterns related to an environment of a host vehicle from sequentially recorded data.

At 502, respective sets of characteristics detected by a perception system of a host vehicle in an environment of the host vehicle may be determined for a current point in time and for a predefined number of previous points in time. At 504, a set of current input data associated with the sets of characteristics may be generated for the current point in time. At 506, a set of memory data may be generated by aggregating the sets of characteristics for the previous points in time. At 508, an attention algorithm may be applied to the set of current input data and to the set of memory data in order to generate a joined spatial-temporal data set. At 510, at least one pattern may be determined for the environment of the host vehicle from the joined spatial-temporal data set.

According to various embodiments, the set of current input data and the set of memory data may be associated with respective grid maps defined for the environment of the vehicle.

According to various embodiments, when applying the attention algorithm, a matching may be determined between a cell of the grid map associated with the set of current input data and a plurality of cells of the grid map associated with the set of memory data.

According to various embodiments, the attention algorithm may include weights which may be defined by relating elements of the set of current input data and assigned elements of the set of memory data, and the weights of the attention algorithm may be applied to values generated by employing a union of the elements of the set of current input data and the assigned elements of the set of memory data in order to provide the joined spatial-temporal data set as an output of the attention algorithm.

According to various embodiments, relating the elements of the set of current input data and the assigned elements of the set of memory data may include: generating a query vector by employing the elements of the set of current input data, generating a key vector by employing the assigned elements of the set of memory data and the elements of the set of current input data, and estimating a dot product of the query vector and the key vector from which the weights of the attention algorithm are estimated.

According to various embodiments, the key vector may be generated based on a concatenation of the assigned elements of the set of memory data and the elements of the set of current input data.

According to various embodiments, for generating the joined spatial-temporal data set, the output of the attention algorithm may be further combined with the set of memory data, and a gating procedure may be configured to define weights for combining respective channels within the set of memory data with the output of the attention algorithm.

According to various embodiments, information regarding respective distances with respect to a spatial reference point may be associated with the set of current input data and with the set of memory data in order to track movements of objects between one of the previous points in time and the current point in time.

According to various embodiments, the information regarding the respective distances associated with the set of memory data may be determined via a motion model which may include a velocity estimation for the objects.

According to various embodiments, positional information may be associated with elements of the set of current input data and assigned elements of the set of memory data in order to estimate a velocity of an object in the environment of the host vehicle.

According to various embodiments, the at least one pattern may be provided to an algorithm for object detection which determines at least one of a position, a velocity and coordinates of a bounding box associated with at least one of a plurality of objects, located in the environment of the host vehicle, and/or to an algorithm for segmenting the environment of the host vehicle.

Each of the steps 502, 504, 506, 508, 510 and the further steps described above may be performed by computer hardware components.

Figure 6:
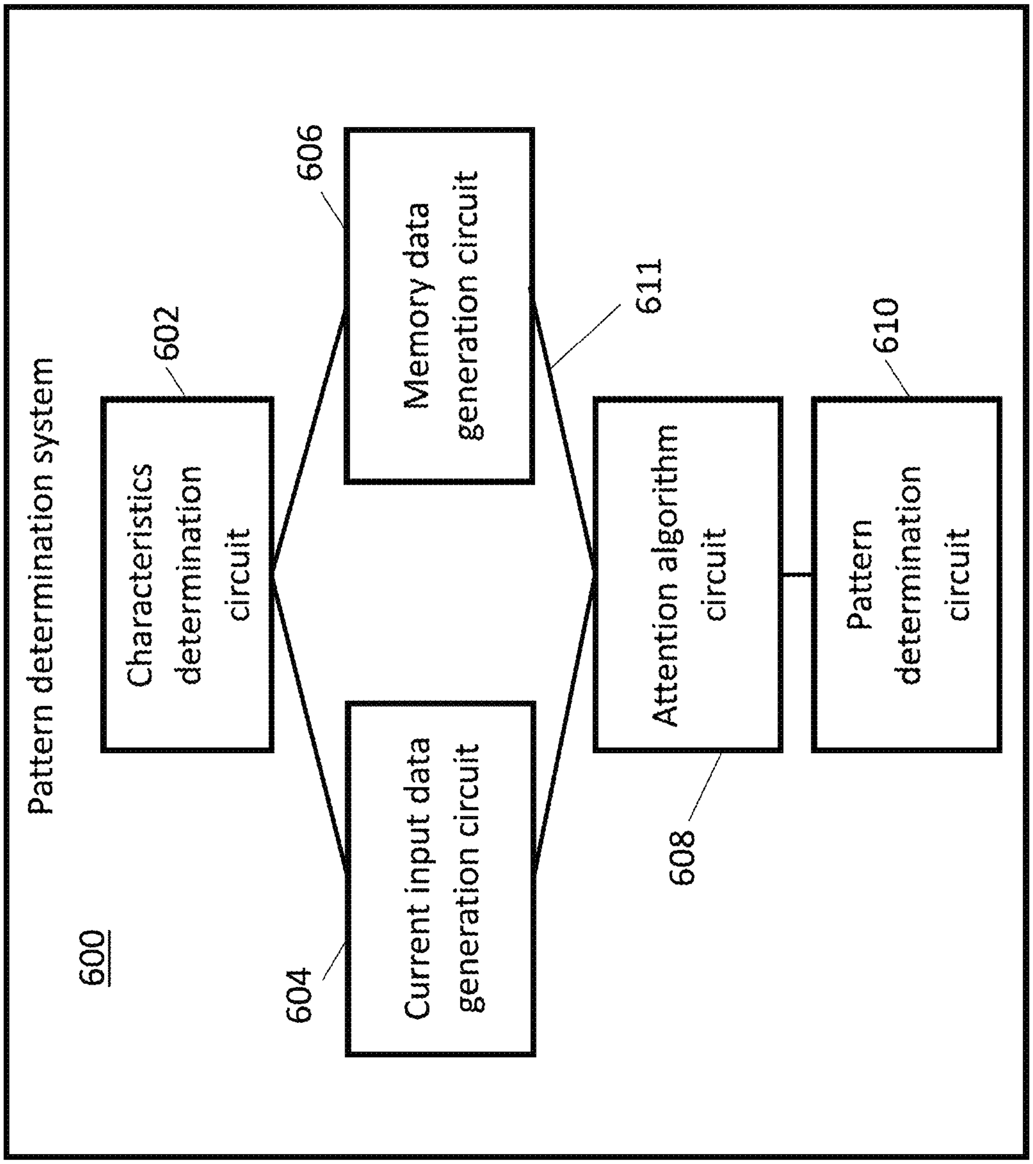
FIG. 6 is an illustration of a system according to various embodiments.

FIG. 6 shows a pattern determination system 600 according to various embodiments. The pattern determination system 600 may include a characteristics determination circuit 602, a current input data generation circuit 604, a memory data generation circuit 606, an attention algorithm circuit 608 and a pattern determination circuit 610.

The characteristics determination circuit 602 may be configured to determine respective sets of characteristics detected by a perception system of a host vehicle in an environment of the host vehicle for a current point in time and for a predefined number of previous points in time.

The current input data generation circuit 604 may be configured to generate a set of current input data associated with the sets of characteristics for the current point in time.

The memory data generation circuit 606 may be configured to generate a set of memory data by aggregating the sets of characteristics for the previous points in time.

The attention algorithm circuit 608 may be configured to apply an attention algorithm to the set of current input data and to the set of memory data in order to generate a joined spatial-temporal data set.

The pattern determination circuit 610 may be configured to determine at least one pattern for the environment of the host vehicle from the joined spatial-temporal data set.

The characteristics determination circuit 602, the current input data generation circuit 604, the memory data generation circuit 606, the attention algorithm circuit 608 and pattern determination circuit 610 may be coupled to each other, e.g. via an electrical connection 611, such as e.g. a cable or a computer bus or via any other suitable electrical connection to exchange electrical signals.

A "circuit" may be understood as any kind of a logic implementing entity, which may be special purpose circuitry or a processor executing a program stored in a memory, firmware, or any combination thereof.

Figure 7:
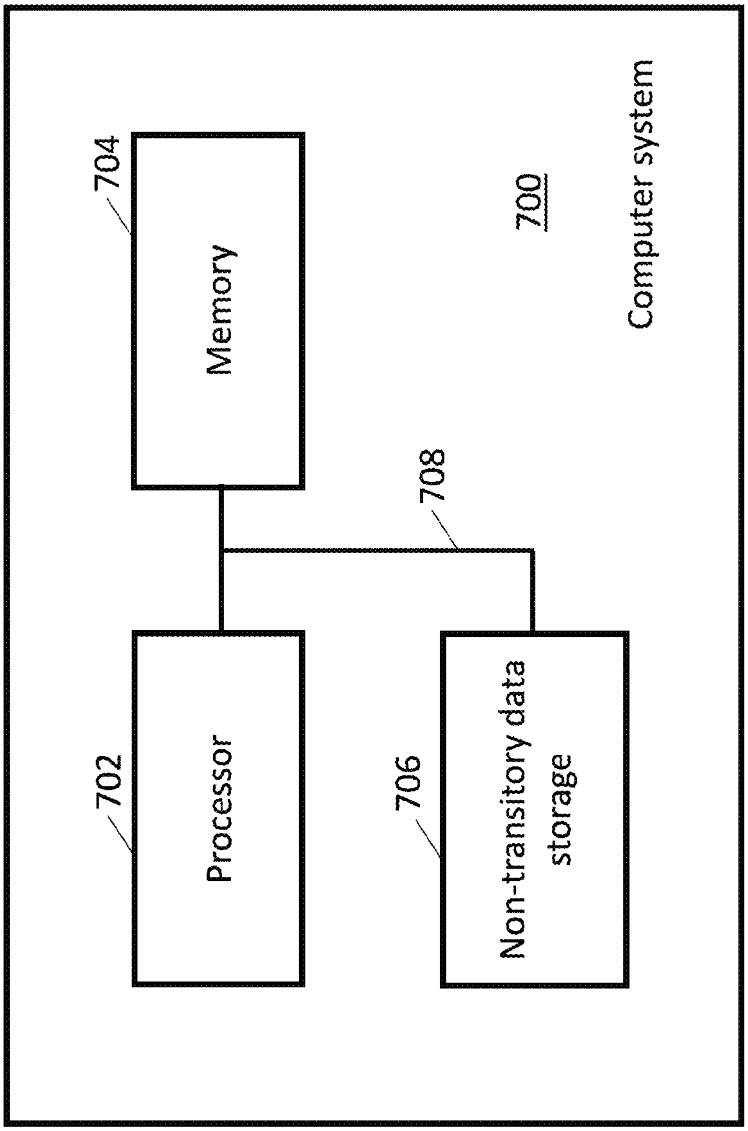
FIG. 7 is an illustration of a computer system with a plurality of computer hardware components configured to carry out steps of a computer implemented method as described herein.

FIG. 7 shows a computer system 700 with a plurality of computer hardware components configured to carry out steps of a computer implemented method for predicting respective trajectories of a plurality of road users according to various embodiments. The computer system 700 may include a processor 702, a memory 704, and a non-transitory data storage 706.

The processor 702 may carry out instructions provided in the memory 704. The non-transitory data storage 706 may store a computer program, including the instructions that may be transferred to the memory 704 and then executed by the processor 702.

The processor 702, the memory 704, and the non-transitory data storage 706 may be coupled with each other, e.g. via an electrical connection 708, such as e.g. a cable or a computer bus or via any other suitable electrical connection to exchange electrical signals.

As such, the processor 702, the memory 704 and the non-transitory data storage 706 may represent the characteristics determination circuit 602, the current input data generation circuit 604, the memory data generation circuit 606, the attention algorithm circuit 608 and the pattern determination circuit 610, as described above.

The terms "coupling" or "connection" are intended to include a direct "coupling" (for example via a physical link) or direct "connection" as well as an indirect "coupling" or indirect "connection" (for example via a logical link), respectively.

It will be understood that what has been described for one of the methods above may analogously hold true for the pattern determination system 600 and/or for the computer system 700.

REFERENCE NUMERAL LIST

100 vehicle
110 perception system
115 field of view
120 computer system
121 processing unit
122 memory, database
124 control system
125 dynamic context
130 object
160 static context
210 set of current input data
220 set of memory data
230 attention algorithm
240 first residual block
250 second residual block
260 output of the method
270 task module
310 grid cell associated with the set of current input data
320 plurality of cells associated with the set of memory data
330 imaginary vehicle
340 dashed line
350 dashed line
360 output of the attention algorithm
370 channel gating module
371 calculation of weights
372 application of weights to memory data
373 application of weights to the output of the attention algorithm
374 calculation of weighted sum
375 layer norm
380 feedforward block
381 combination
385 layer norm
410 grid associated with current input data enriched by positional information
420 grid associated with the set of memory data enriched with positional information
430 distance with respect to reference position
440 projected distance for memory data
450 relative position
500 flow diagram illustrating a method for determining patterns related to an environment of a host vehicle from sequentially recorded data
502 step of determining, for a plurality of objects in an environment of a host vehicle, a respective set of characteristics detected by a perception system of the host vehicle for a current point in time and for a predefined number of previous points in time
504 step of generating a set of current input data associated with the sets of characteristics for the current point in time
506 step of generating a set of memory data by aggregating the sets of characteristics for the predefined number of previous points in time
508 step of applying an attention algorithm to the set of current input data and to the set of memory data in order to generate a joined spatial-temporal data set
510 step of determining at least one pattern related to the plurality of objects from the joined spatial-temporal data set
600 pattern determination system
602 characteristics determination circuit
604 current input data generation circuit
606 memory data generation circuit
608 attention algorithm circuit
610 pattern determination circuit
611 connection
700 computer system according to various embodiments
702 processor
704 memory
706 non-transitory data storage
708 connection

What is claimed is:

1. A computer implemented method for determining patterns related to an environment of a host vehicle from sequentially recorded data, the method comprising:
determining respective sets of characteristics detected by a perception system of the host vehicle in the environment of the host vehicle for a current point in time and for a predefined number of previous points in time,
wherein the respective sets of characteristics include a current position, a current velocity and an object class for a plurality of objects, and
via a processing unit of the host vehicle:
generating a set of current input data associated with the set of characteristics for the current point in time,
generating a set of memory data by aggregating the sets of characteristics for the previous points in time,
applying an attention algorithm to the set of current input data and to the set of memory data in order to generate a joined spatial-temporal data set, wherein the attention algorithm includes weights which are defined by relating elements of the set of current input data and assigned elements of the set of memory data, and wherein the weights of the attention algorithm are applied to values generated by employing a union of the elements of the set of current input data and the assigned elements of the set of memory data in order to provide the joined spatial-temporal data set as an output of the attention algorithm, determining at least one pattern for the environment of the host vehicle from the joined spatial-temporal data set, wherein the pattern is provided as an abstract feature map which is stored in a grid map, and wherein tasks implemented as machine learning algorithms are applied to the abstract feature map in order to derive information regarding a position and/or dynamics of a respective object in the environment of the host vehicle, and/or in order to perform a grid segmentation of the environment of the host vehicle, and controlling the host vehicle based on the at least one pattern related to the environment of the host vehicle from the joined spatial-temporal data set, wherein:

for generating the joined spatial-temporal data set, the output of the attention algorithm is further combined with the set of memory data, and a gating procedure is configured to define weights for combining respective channels within the set of memory data with the output of the attention algorithm.

2. The method according to claim 1, wherein:

the set of current input data and the set of memory data are associated with respective grid maps defined for the environment of the host vehicle.

3. The method according to claim 2, wherein:

when applying the attention algorithm, a matching is determined between a cell of the grid map associated with the set of current input data and a plurality of cells of the grid map associated with the set of memory data.

4. The method according to claim 1, wherein:

relating the elements of the set of current input data and the assigned elements of the set of memory data includes:

generating a query vector by employing the elements of the set of current input data, generating a key vector by employing the assigned elements of the set of memory data and the elements of the set of current input data, and estimating a dot product of the query vector and the key vector from which the weights of the attention algorithm are estimated.

5. The method according to claim 4, wherein:

the key vector is generated based on a concatenation of the assigned elements of the set of memory data and the elements of the set of current input data.

6. The method according to claim 1, wherein:

information regarding respective distances with respect to a spatial reference point is associated with the set of current input data and with the set of memory data in order to track movements of objects between one of the previous points in time and the current point in time.

7. The method according to claim 6, wherein:

the information regarding the respective distances associated with the set of memory data is determined via a motion model which includes a velocity estimation for the objects.

8. The method according to claim 1, wherein:

positional information is associated with elements of the set of current input data and assigned elements of the set of memory data in order to estimate a velocity of an object in the environment of the host vehicle.

9. The method according to claim 1, wherein:

the at least one pattern is provided as an input to an algorithm for object detection which determines at least one of a position, a velocity and coordinates of a bounding box associated with one of a plurality of objects located in the environment of the host vehicle, and/or to an algorithm for segmenting the environment of the host vehicle.

10. A computer system comprising:

one or more processors; and memory including instructions that, when executed by the one or more processors, perform a method including:

determining respective sets of characteristics detected by a perception system of a host vehicle in the environment of the host vehicle for a current point in time and for a predefined number of previous points in time, wherein the characteristics include a current position, a current velocity and an object class for a plurality of objects, and generating a set of current input data associated with the set of characteristics for the current point in time, generating a set of memory data by aggregating the sets of characteristics for the previous points in time, applying an attention algorithm to the set of current input data and to the set of memory data in order to generate a joined spatial-temporal data set, wherein the attention algorithm includes weights which are defined by relating elements of the set of current input data and assigned elements of the set of memory data, and wherein the weights of the attention algorithm are applied to values generated by employing a union of the elements of the set of current input data and the assigned elements of the set of memory data in order to provide the joined spatial-temporal data set as an output of the attention algorithm, determining at least one pattern for the environment of the host vehicle from the joined spatial-temporal data set, wherein the pattern is provided as an abstract feature map which is stored in a grid map, and wherein tasks implemented as machine learning algorithms are applied to the abstract feature map in order to derive information regarding a position and/or dynamics of a respective object in the environment of the host vehicle, and/or in order to perform a grid segmentation of the environment of the host vehicle, and controlling the host vehicle based on the at least one pattern related to the environment of the host vehicle from the joined spatial-temporal data set, wherein:

for generating the joined spatial-temporal data set, the output of the attention algorithm is further combined with the set of memory data, and a gating procedure is configured to define weights for combining respective channels within the set of memory data with the output of the attention algorithm.

11. The host vehicle including the perception system and the computer system of claim 10.

12. A non-transitory computer-readable medium comprising instructions for carrying out a method comprising:

determining respective sets of characteristics detected by a perception system of a host vehicle in the environment of the host vehicle for a current point in time and for a predefined number of previous points in time, wherein the characteristics include a current position, a current velocity and an object class for a plurality of objects, and generating a set of current input data associated with the set of characteristics for the current point in time, generating a set of memory data by aggregating the sets of characteristics for the previous points in time, applying an attention algorithm to the set of current input data and to the set of memory data in order to generate a joined spatial-temporal data set, wherein the attention algorithm includes weights which are defined by relating elements of the set of current input data and assigned elements of the set of memory data, and wherein the weights of the attention algorithm are applied to values generated by employing a union of the elements of the set of current input data and the assigned elements of the set of memory data in order to provide the joined spatial-temporal data set as an output of the attention algorithm, determining at least one pattern for the environment of the host vehicle from the joined spatial-temporal data set, wherein the pattern is provided as an abstract feature map which is stored in a grid map, and wherein tasks implemented as machine learning algorithms are applied to the abstract feature map in order to derive information regarding a position and/or dynamics of a respective object in the environment of the host vehicle, and/or in order to perform a grid segmentation of the environment of the host vehicle, and controlling the host vehicle based on the at least one pattern related to the environment of the host vehicle from the joined spatial-temporal data set, wherein:

for generating the joined spatial-temporal data set, the output of the attention algorithm is further combined with the set of memory data, and a gating procedure is configured to define weights for combining respective channels within the set of memory data with the output of the attention algorithm.

* * * * *